United States Patent [19]

Fukunaga

[11] Patent Number: 4,985,914
[45] Date of Patent: Jan. 15, 1991

[54] VOICE STORAGE/RETRIEVAL SYSTEM WITH MEMORY ADDRESS GENERATOR SUCCESSIVELY INITIALIZED WITH START-POINT ADDRESSES

[75] Inventor: Masayuki Fukunaga, Tokyo, Japan

[73] Assignee: NEC Corporation, Japan

[21] Appl. No.: 464,327

[22] Filed: Jan. 12, 1990

[30] Foreign Application Priority Data

Jan. 13, 1989 [JP] Japan .................................. 1-4911

[51] Int. Cl.$^5$ .............................................. H04M 3/50
[52] U.S. Cl. .......................................... 379/88; 379/89
[58] Field of Search .............................. 379/88, 89, 84

[56] References Cited

U.S. PATENT DOCUMENTS 4,625,081 11/1986 Lotito et al. ............................ 379/88

Primary Examiner—Thomas W. Brown
Attorney, Agent, or Firm—Laff, Whitesel, Conte & Saret

[57] ABSTRACT

In a voice storage and retrievel system, a controller generates a series of start-point addresses and a series of end-point addresses from a dialled signal sent from a registered subscriber station. The start-point addresses are sequentially stored into a first FIFO and the end-point addresses are successively stored into a second FIFO. The output of the first FIFO is successively supplied as an initial count value to an address generator whose output is connected to a comparator as well as to a voice segment memory, the output of the second FIFO being supplied to the comparator as a reference value. The address generator increments its output beginning with each successive initial value to read voice segments from the voice segment memory for transfer to a line buffer coupled to the subscriber station. When the output of address generator becomes equal to the reference value, the comparator causes the FIFO memories to advance their addresses by one location so that subsequent addresses appear at their respective outputs. An end-of-block detect counter is provided to detect when the line buffer is full to cause it to read the voice segments therefrom for transmission to the subscriber station.

4 Claims, 5 Drawing Sheets

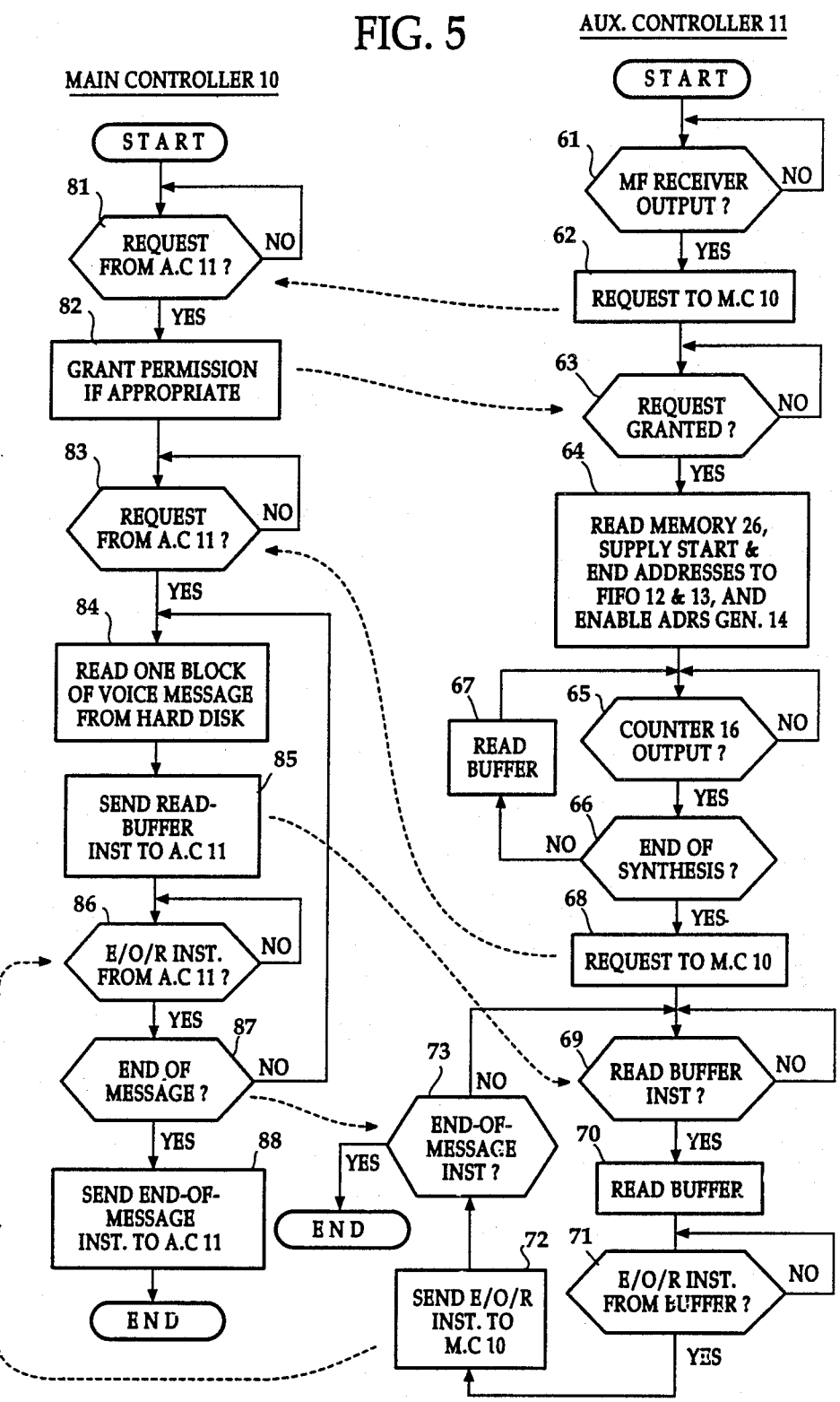

VOICE STORAGE/RETRIEVAL SYSTEM WITH MEMORY ADDRESS GENERATOR SUCCESSIVELY INITIALIZED WITH START-POINT ADDRESSES

BACKGROUND OF THE INVENTION

The present invention relates generally to voice storage and retrieval systems capable of providing speech synthesis, and move specifically to a voice storage and retrieval system of the type capable of reducing the burden of a controller that controls the synthesis of a voice response from stored voice segments.

FIG. 1 shows one prior art voice storage and retrieval system incorporated in a voice mail system. In this system, a synthesized voice is first generated from voice segments stored in a voice segment memory 4 and sent to a requesting subscriber to indicate a source mail box number and the date and time of day at which a voice message is recorded. Transmission of the synthesized voice is followed by the transmission of the recorded voice message which is stored in a hard disk 6. When reconstructing voice segments, a main controller 1 issues a request to an auxiliary controller 2 which responds to it by supplying a direct memory access (DMA) controller 3 with the addresses of voice segments in the memory 4 and other necessary information and by specifying one of a plurality of buffer memories 7. DMA controller 3 accesses voice segment memory 4 to read the addressed voice segments therefrom for transfer to the specified buffer memory. When retrieving a recorded voice message, main controller 1 issues a request to a disk controller 5 to read a recorded voice message from hard disk 6 and supplies it to the specified buffer memory where it is stored temporarily for later delivery to the requesting subscriber under control of the auxiliary controller in order to accommodate different transmission speeds among subscriber lines.

One disadvantage of this prior art system is that during the time the voice segments are being transferred to the buffer memory, the bus system of the auxiliary controller is exclusively occupied by the DMA controller 3 and the operating efficiency of the auxiliary controller is significantly reduced.

SUMMARY OF THE INVENTION

It is therefore an object of the present invention to provide a voice storage and retrieval system in which voice segments are retrieved from a memory in response to a memory address which is incremented from a successively initialized value, rather than by address generated by a DMA controller, to reduce the burden of a controller.

According to a broader aspect of the present invention, there is provided a voice storage and retrieval system which comprises at least one buffer memory which can be accessed from subscriber stations through a switched network. In response to a request from a subscriber station, a controller generates a series of start-point addresses which respectively signify the beginnings of particular voice segments which are to be sequentially read out of a voice segment memory and a series of end-point addresses respectively signifying ends of the particular voice segments. The start-point addresses are sequentially stored into successive storage locations of a first FIFO (first-in-first-out) memory and the end-point addresses are successively stored into storage locations of a second FIFO memory. The output of the first FIFO is successively supplied as an initial count value to address generator whose output is connected to one input a comparator as well as to a voice segment memory. The output of the second FIFO is connected to the other input of the comparator as a reference value. The address generator periodically increments its output count beginning with an initial value loaded from the first FIFO to read a voice segment from the voice segment memory for transfer to the buffer memory. When the address count supplied to the voice segment memory becomes equal to the reference value, the comparator causes each of the first and second FIFO memories to advance their stored addresses by one storage location so that a subsequent start-point address and a subsequent end-point address respectively appear at their outputs. The controller directs the buffer memory to read out the voice segments transferred from the voice segment memory onto the subscriber station.

According to a second aspect, the voice storage and retrieval system of the present invention further includes a disk storage medium for recording voice messages and a disk controller to provide sequential read/write operations between the disk storage medium and the buffer memory so that during a message recording mode a block of a voice message from the buffer memory is successively read out into the disk storage medium and during a message retrieval mode a block of the stored voice message is sussessively read out of the disk storage medium into the buffer memory. An end-of-block detector is provided to detect when the buffer memory becomes full and generates an output signal. The controller is responsive to a request from the subscriber station for generating a series of start-point addresses respectively signifying beginnings of particular voice segments to be sequentially read out of the voice segment memory and a series of end-point addresses respectively signifying ends of the particular voice segments and for sequentially storing the start-point addresses of each block into the successive storage locations of the first FIFO memory and sequentially supplying the end-point addresses of each block into the successive storage locations of the second FIFO memory. The controller causes the buffer memory to read out voice segments for transmission to the subscriber station in response to the output signal from the end-of-block detector during either of the message recording and retrieval modes. The controller further causes the buffer memory to successively read and write a block of a voice message from the subscriber station from the subscriber station during the recording mode in response to a command signal from the disk controller and causes the buffer memory to successively write and read a block of a voice message transferred from the disk storage medium for transmission to the subscriber station.

BRIEF DESCRIPTION OF THE DRAWINGS

The present invention will be described in further detail with reference to the accompanying drawings, in which:

FIG. 5 is a flowchart illustrating programmed instructions performed by the main and auxiliary controllers of FIG. 2 during a message retrieval mode of the voice mail system.

DETAILED DESCRIPTION

Figure 1:
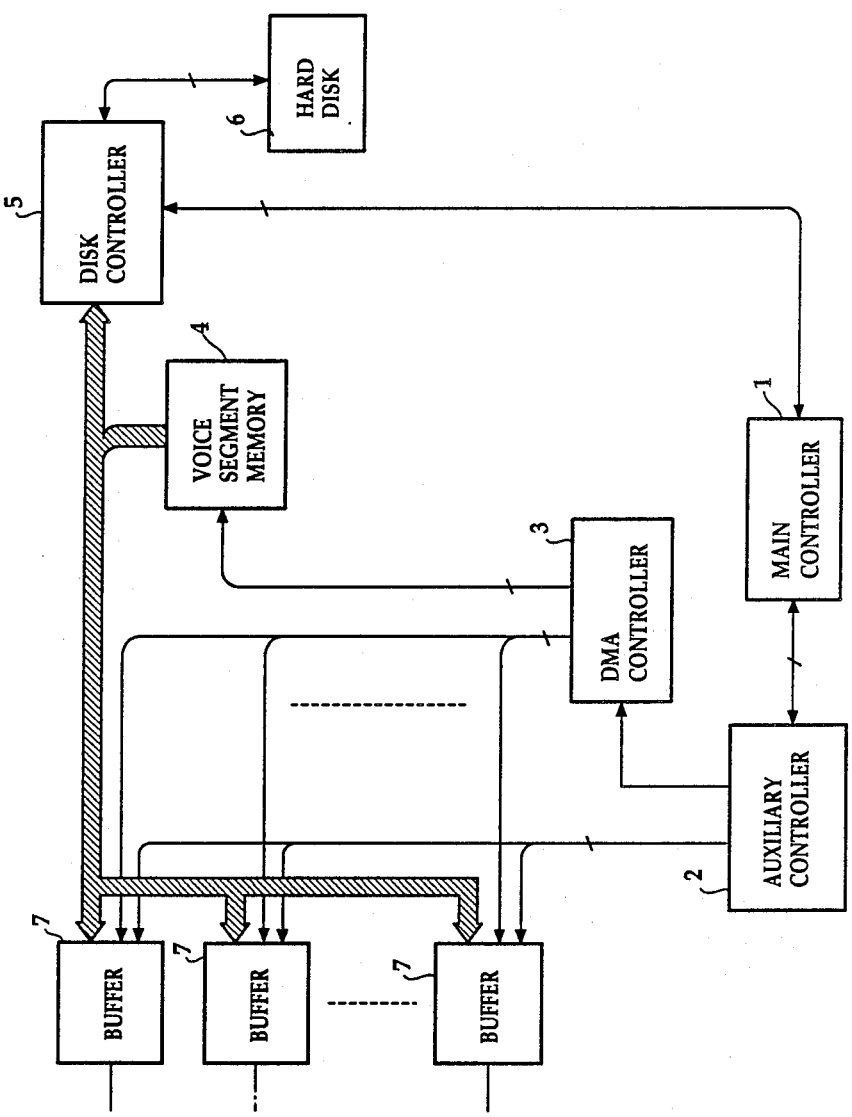
FIG. 1 is a block diagram of a prior art voice storage and retrieval system.
Figure 2:
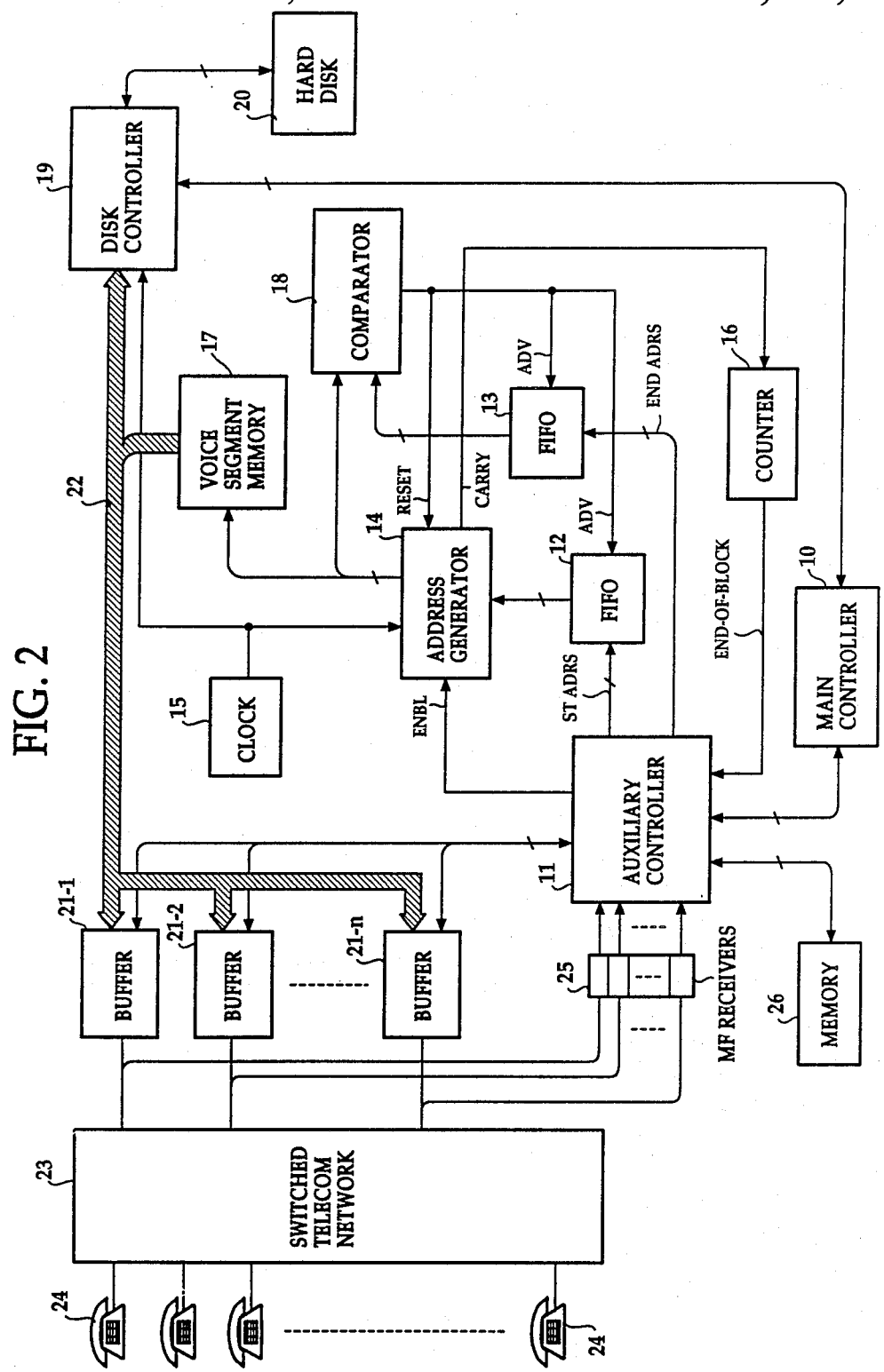
FIG. 2 is a block diagram of a voice storage and retrieval system of the present invention as employed in a voice mail system.

Referring now to FIG. 2, there is shown a voice storage and retrieval system of the present invention as incorporated in a voice mail system which is accessed through a switched telecommunications network. In the voice mail system, the memory plane of a mass storage medium such as magnetic hard disk is partitioned into a plurality of what is called "mail boxes" which are uniquely assigned to registered subscribers of of the system. When a source user of the system wants to send a voice message, he or she dials a mail box number identifying a destination mail box in which the message is recorded. At intervals, the subscribers check their own mail box by dialing their unique mail box number and can hear a recorded message if there is one. Push-button telephones are used by the subscribers to send a mail box number in the form of a multifrequency tone signal.

If a registered subscriber wants to send his or her voice message to a desired mail box or wants to hear the contents of his or her mail box, the user accesses through the switched telecommunications network 23 to a selected one of multifrequency receivers 25 as well as to a selected one of buffer memories 21-1 through 21-'n. The user sends a tone dial signal into the selected MF receiver 25, where it is decoded and fed to an auxiliary controller 11 of of the voice storage and retrieval system. A main controller 10 provides overall control for the system by coordinating between a disk controller 19 and the auxiliary controller 11.

On receiving a dialled number from a requesting subscriber, auxiliary controller 11 stores it into a specified location of a memory 26 as well as the date and time of day and generates a series of start-point addresses of voice segments to be resconstructed and a series of end-point addresses of such voice segments from data stored in the memory 26.

Each buffer memory comprises a pair of buffers of the same storage capacity which are alternately switched into read and write modes. When one of the buffers is filled to its maximum capacity, it is switched to a read mode and the other buffer is switched into a write mode.

Figure 3:
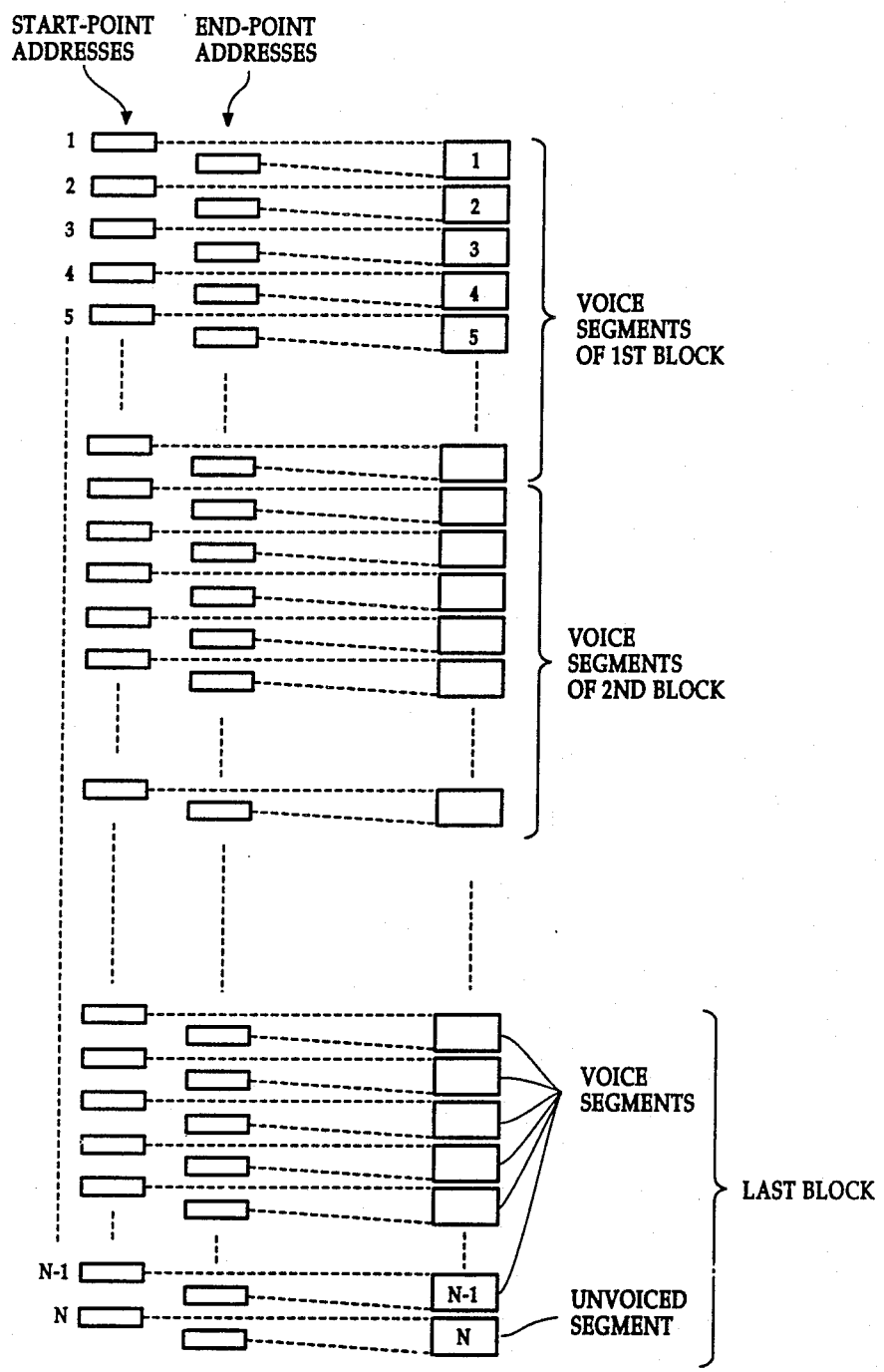
FIG. 3 is an illustration of the structure of voice segments to be synthesized and the relationships between the synthesized voice segments and start-point addresses and end-point addreses.

First-in-first-out (FIFO) memories 12 and 13 are connected to auxiliary controller 11 to respectively store the series of start-point addresses and the series of end-point addresses. As illustrated in FIG. 3, a synthesized voice comprises a series of voice segments which are selected from a voice segment memory 17. The selected voice segments ae read out from memory 17 and transferred though a bus 22 and written into an alternate one of the buffers of the selected buffer memory 21, so that all the selected voice segments are divided into a plurality of blocks of data. Each start-point addresses signifies the end of that voice segment, and the end of a last block is signified by an unvoiced segment. Each voice segment stored in the voice segment memory 17 is a sound such as "one," "two," and "three". Each voice segment is encoded with $M \times N$ bits, where M is used to represent a basic voice element and N represents the amount of basic voice elements comprising a given voice segment.

An address generator 14 is provided, which essentially comprises two counters, one of which is connected to a clock source 15 to generate a carry output upon count of every M clock pulses for coupling to an end-of-block detector, or counter 16 which supplies an output signal to auxiliary controller 11 when the amount of data bits read out of voice segment memory 17 reaches the maximum which corresponds to the maximum capacity of the buffer of each buffer memory 21. The other counter of address generator 14 is loaded with a start-point address successively supplied from FIFO 12 as an initial value and is incremented, generating an address signal which varies from the start-point address toward the end-point address of a particular voice segment.

This address signal is applied to the voice segment memory 17 as well as to one input of a digital comparator 18. End-point addresses are successively supplied from FIFO 13 to the other input of comparator 18 as a reference value. When the address signal supplied to voice segment memory 17 reaches the end-point address applied to comparator 18, the latter supplies a reset pulse to address generator 14 as well as to FIFO memories 12 and 13 to advance their stored addresses by one cell location, so that the initial value of the address generator 14 and the reference value of comparator 18 are updated for retrieving the next voice segment. In this way, address generator 14 is successively loaded with a start-point address when the comparator 18 detects a match between the incremented address count and each of the updated end-point address.

A message recording mode of the voice mail system will now be described below with reference to a flowchart shown in FIG. 4.

When the voice storage and retrieval system is accessed from a registered user through the switched telecommunications network 23, one of the buffer memories 21 and one of MF receivers 25 are seized for that user. The user sends tone dial signals into the selected MF receiver 25, identifying a destination mail box and his own mail box which are reserved in the hard disk 20. The tone signals decoded by the selected MF receiver 25. The program execution of the message recording mode begins with decision step 31 which checks to see if there is an output signal from the selected MF receiver 25. If there is one, control proceeds to step 32 to write the output of the MF receiver 25 into a specified location of memory 26. Exit then is to step 33 which directs the reading of the data stored in the specified location of memory 26 and the determining of a series of voice segments to synthesize a voice of the dialled information to generate a series of start-point addresses each identifying the start-point of a voice segment comprising the synthesized voice and a series of end-point addresses each identifying the end-point of that voice segment. The start-point and end-point addresses are respectively supplied to FIFO memories 12 and 13.

Returning to FIG. 2, address generator 14 is loaded with the first start-point address that appears at the output of FIFO 12 and is enabled to start counting clock pulses supplied from clock source 15. Comparator 18 is concurrently supplied with the first end-point address that appears at the output of FIFO 13. Upon each clock count, the address count is incremented, beginning with the loaded start-point address and a first voice segment is read out of memory 17 into a selected one of the buffer memories 21 to which the requesting user is connected. When this incremented value equals the end-point address supplied to the comparator, a reset pulse is fed to the address generator 14 to update its initial value with the next start-point address. The same reset pulse is applied to FIFO memories 12 an 13 to advance their contents by one cell location so that the second start-point address and the second end-point address appear at their outputs. This process is repeated and a series of voice segments are retrieved and written into the the specified buffer memory 21. Upon count of M clock pulses, address generator 14 supplies a carry output to end-of-block detect counter 16. When the selected buffer memory 21 is filled to its capacity, counter 16 generates an end-of-block signal.

Figure 4:
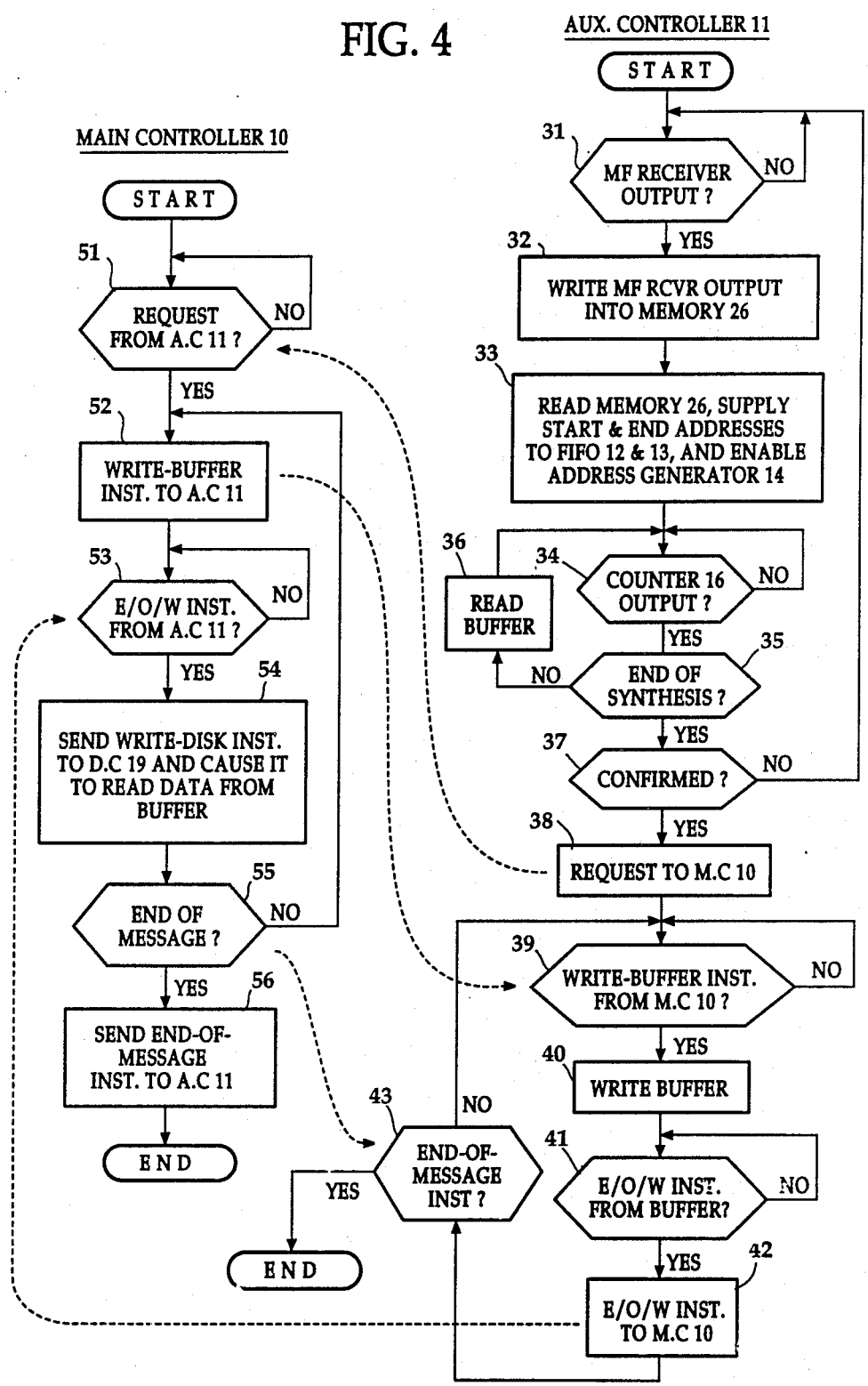
FIG. 4 is a flowchart illustrating programmed instructions performed by the main and auxiliary controllers of FIG. 2 during a message recording mode of the voice mail system.

In FIG. 4, auxiliary controller 11 knows this fact (step 34) and directs the selected buffer memory 21 to read out the stored voice segments for transmission to the requesting user station (step 36). The above process is repeated unitl all the necessary voice segments are read out into the selected buffer and transmitted therefrom to the user (step 35). On hearing the voice response repeating what the system has received and decoded, the user confirms if they are exactly what the user wants to send to the voice mail system. If they are correct, the user sends a confirmation signal by depressing a prescribed button such as #-mark button. If this confirmation signal is not received, control returns to step 31 ro repeat the process until the user gives a confirmation. When this occurs, auxiliary controller 11 sends a request to main controller 10 (step 38) for permission to proceed further.

On receiving a request from auxiliary controller 11 (step 51), main controller 10 applied a "write-buffer" instruction to auxiliary controller 11 (step 52) if it is not busy performing another task. In response to the "write-buffer" instruction, auxiliary controller 11 proceeds to step 40 to cause the selected buffer memory 21 to write a voice message sent from the requesting user. When the buffer memory is filled to its capacity by part of the voice message, and "end-of-write" instruction is sent from that buffer memory 21 to auxiliary controller 11 (step 41), which in turn sends an "end-of-write" instruction to maintain controller 10 (step 42).

Upon the receipt of the "end-of-write" instruction form auxiliary controller 11 (step 53), main controller 10 proceeds to step 54 to direct the disk controller 19 to cause hard disk 20 to switch to a write mode and read out the contents of the buffer memory into a location of the hard disk 20 that is uniquely specified by the destination mail box number dialled from the source user. When one block of the voice message, which corresponds to the maximum capacity of the buffer memory, is recorded into hard disk 20, main controller 10 returns to step 52 to write the next block of voice message. In this way, the whole contents of the voice message are recorded. When this occurs (step 55), control goes to step 56 to send an "end-of-message" instruction to auxiliary controller 11.

On the other hand, auxiliary controller 11 loops through steps 39 to 43 to successively operate the buffer memory in a write mode until the "end-of-message" instruction is received (step 43).

A message retrieval mode of the voice mail system will now be described below with reference to a flow-chart shown in FIG. 5.

When a registered user wants to hear a message which may be left in his or her own mail box, the user accesses the voice mail system through the switched telecommunications network 23, and one of the buffer memories 21 and one of the MF receivers 25 are seized for that user in the same manner as during the message recording mode. Upon seizure of the buffer memory, the user sends a tone signal indicating the own (destination) mail box number.

The program execution of the message retrieval mode begins with step 61 in which auxiliary controller 11 checks to see if there is an output signal from the MF receivers 25. If there is one, auxiliary controller 11 exits to step 62 to send a request to main controller 10. In response to this request (step 81), main controller 10 grants permission to it if it is not busy performing another task (step 82). If the request is granted (step 63) auxiliary controller 11 proceeds to step 64 to access the memory 26 with the dialled information to read a source mail box number from which the message has been received and determines a series of voice segments to synthesize a voice of the source mail box number and a voice of the date and time of day at which the message was received and supplies FIFO memories 12 and 13 with a series of start-point addresses of such voice segments and a series of end-point addresses of the voice segments, respectively. Auxiliary controller 11 now enables address generator 14 to start counting clock pulses to increment its count beginning with the first start-point address which appears at the output of FIFO 12, thus reading a first voice segment from the voice segment memory 17.

As in the message recording mode, the first first end-point address appears at output of FIFO 13 and is applied to comparator 18 as a first reference value, so that at the end of the readout of the first voice segment from memory 17, FIFO memories 12 and 13 are advanced by one cell location and the initial value of address generator 14 is updated with the next start-point address and the reference value of comparator 18 is also updated with the next end-point address.

Continuing in this way, voice segments are sequentially read out of memory 17 and transferred through bus 22 to the selected buffer memory 21 and counter 16 is incremented in response to successive carry outputs from address generator 14. When the selected buffer memory is filled to the maximum, the end-of-block counter 16 produces an output pulse to auxiliary controller 11 (step 65), which responds to it by directing the selected buffer memory 21 to read out the stored voice segments onto the switched telecommunications network 23 (step 67), allowing the second block of voice segments to be stored thereinto. Control returns to block 65 to detect if there is an output from the end-of-block counter 16. Continuing in this way, whole blocks of voice segment memory 17 and sent to the subscriber. When this occurs (step 66), auxiliary controller 11 sends a request to main controller 10 for permission to proceed further (step 68).

On receiving this request (step 83), main controller 10 directs the disk controller 19 to read out a first block of the voice message recorded in the mail box of the subscriber from the hard disk 20 and transfer it at the rate of the clock source 15 (step 84), if main controller 10 is not busy performing another task. Main controller 10 exits to step 85 to apply a "read-buffer" instruction to auxiliary controller 11.

On receiving the "read-buffer" instruction (step 69), auxiliary controller 11 directs the selected buffer memory 21 to read out its contents onto the network 23 (step 70). Exit then is to decision step 71 to check to see if an "end-of-read" instruction is received from the buffer memory 21. If the answer is affirmative, auxiliary controller 11 exists to step 72 to forward an "end-of-read" instruction to main controller 10 and goes to step 73 to check to see if there is an "end-of-message" instruction received from main controller 10.

Meanwhile, main controller 10 exits from step 85 to decision step 86 to check to see if an "end-of-read" instruction is received from auxiliary controller 11. If the answer is affirmative, control moves to step 87 to check to see if the segment transferred to the buffer memory is an unvoiced segment that signifies the end of the recorded voice message. If the answer is negative, control returns to step 84 to direct the disk controller 19 to read out the second block of voice message from hard disk 20 into the buffer memory. In this way, steps 84 to 87 are repreated by main controller 10 to read out the rest of the recorded message from hard disk 20 and steps 69 to 73 are repeated by auxiliary controller 11. at the end of the recorded voice message, main controller 10 exits to step 88 to send an "end-of-message" instruction to auxiliary controller 11. In response to this "end-of-message" instruction (step 73), auxiliary controller 11 terminates the program execution.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A voice storage and retrieval system comprising:
a buffer memory connectable to a subscriber station;
a voice segment memory for storing a plurality of voice segments;
a first first-in-first-out (FIFO) memory having a plurality of successive storage locations;
a second FIFO memory having a plurality of successive storage locations;
control means responsive to request from said subscriber station for generating a series of start-point addresses respectively signifying beginnings of particular voice segments to be sequentially read out of said voice segment memory and a series of end-point addresses respectively signifying ends of said particular voice segments and for sequentially storing said start-point addresses into the successive storage locations of said first FIFO memory and sequentially supplying said end-point addresses into the successive storage locations of said second FIFO memory;
address generator means for incrementing a count value beginning with an initial value which is set equal to an output of said first FIFO memory and supplying the incremented count value to said voice segment memory to sequentially read said particular voice segments out of said voice segment memory into said buffer memory; and
comparator means for detecting a coincidence between said incremented count value and an output of said second FIFO memory, and cusing each of said first a second FIFO memories to advance their stored addresses by one storage location so that a subsequent start-point address and a subsequent end-point address respectively appear at the outputs of said first and second FIFO memories when said coincidence is detected.

2. A voice storage and retrieval system as claimed in claim 1, further comprising detector means for producing an output signal when the amount of data transferred from said voice segment memory to said buffer memory reaches a predetermined value, wherein said control means is capable of causing said buffer memory to read voice segments therefrom for transmission to said subscriber station in response to the output signal from said detector means.

3. A voice storage and retrieval system comprising:
a buffer memory connectable to a subscriber station;
disk storage means for storing voice messages;
disk control means for successively reading data from said buffer memory into said disk storage means during a message recording mode and sequentially reading successive blocks of a stored voice message out of said disk storage means into said buffer memory during a message retrieval mode;
a voice segment memory for storing a plurality of voice segments;
a first first-in-first-out (FIFO) memory having a plurality of successive storage locations;
a second FIFO memory having a plurality of successive storage locations;
detector means for producting an output signal when the amount of data transferred from said voice segment memory to said buffer memory reaches a predetermined value;
control means responsive to a request from said subscriber station for generating a series of start-point addresses respectively signifying beginnings of particular voice segments to be sequentially read out of said voice segment memory and a series of end-point addresses respectively signifying ends of said particular voice segments, sequentially storing said start-point addresses into the successive storage locations of said first FIFO memory and sequentially storing said end-point addresses into the successive storage locations of said second FIFO memory, causing said buffer memory to read voice segments therefrom in response to the output signal from said detector means, and causing said buffer memory to successively write and read a block of a voice message from said subscriber station during said recording mode in response to a command signal from said disk control means and causing said buffer memory to successively write and read a block of the stored voice message transferred from said disk storage means for transmission to said subscriber station during said retrieval mode in response to a command signal from said disk control means;
address generator means for incrementing a count value beginning with an initial value which is set equal to an output of said first FIFO memory and supplying the incremented count value to said voice segment memory as an address signal to sequentially read out said particular voice segments into said buffer memory; and
comparator means for detecting a coincidence between said incremented count value and an output of said second FIFO memory, and causing each of said first and second FIFO memories to advance their stored addresses by one storage location so that a subsequent start-point address and a subsequent end-point address respectively appear at the outputs of said first and second FIFO memories when said coincidence is detected.

4. A voice storage and retrieval system as claimed in claim 3, wherein said control means includes memory means for storing a signal dialled from said subscriber station and deriving said series of start-point and end-point addresses from the dialled signal.

* * * * *